May 21, 1963   J. A. AULD   3,090,501
CEMENT MIXING PLANT
Filed March 23, 1959   4 Sheets-Sheet 1
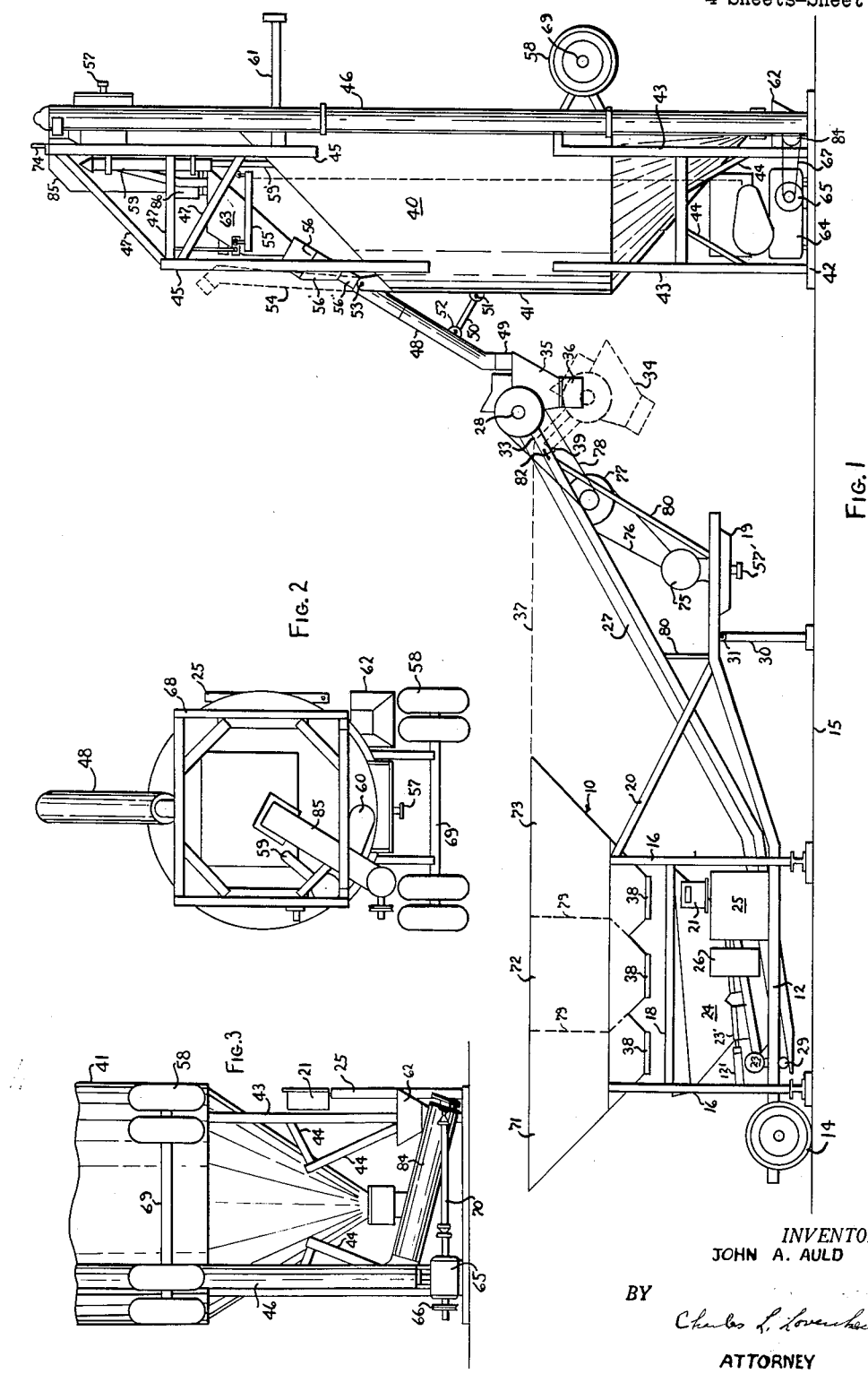
INVENTOR.
JOHN A. AULD
BY
Charles L. Lovenbech
ATTORNEY

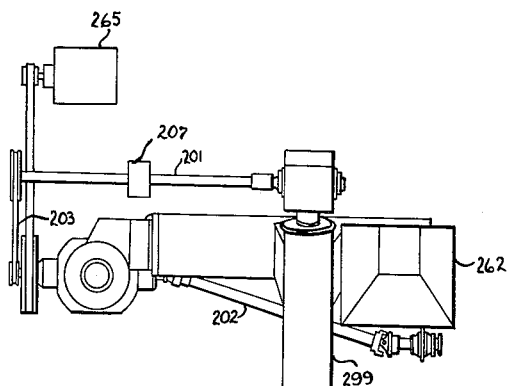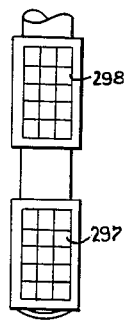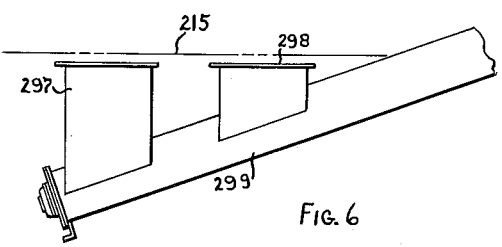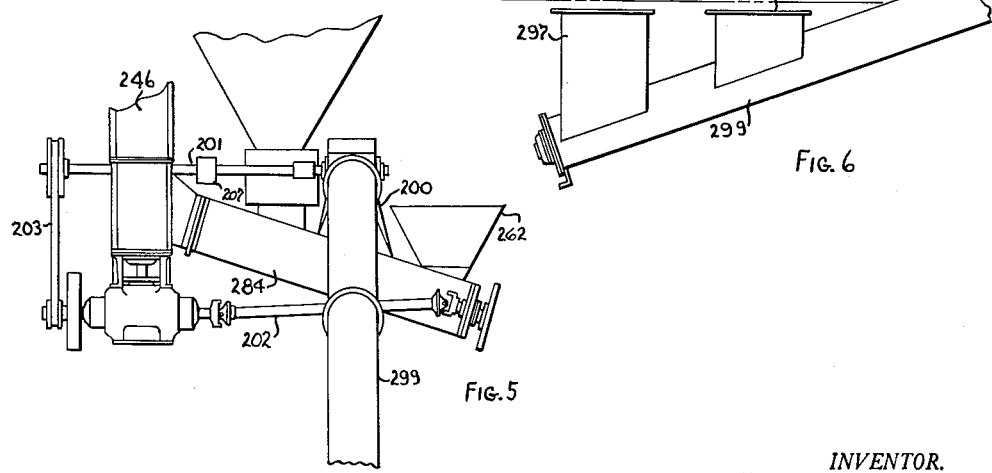

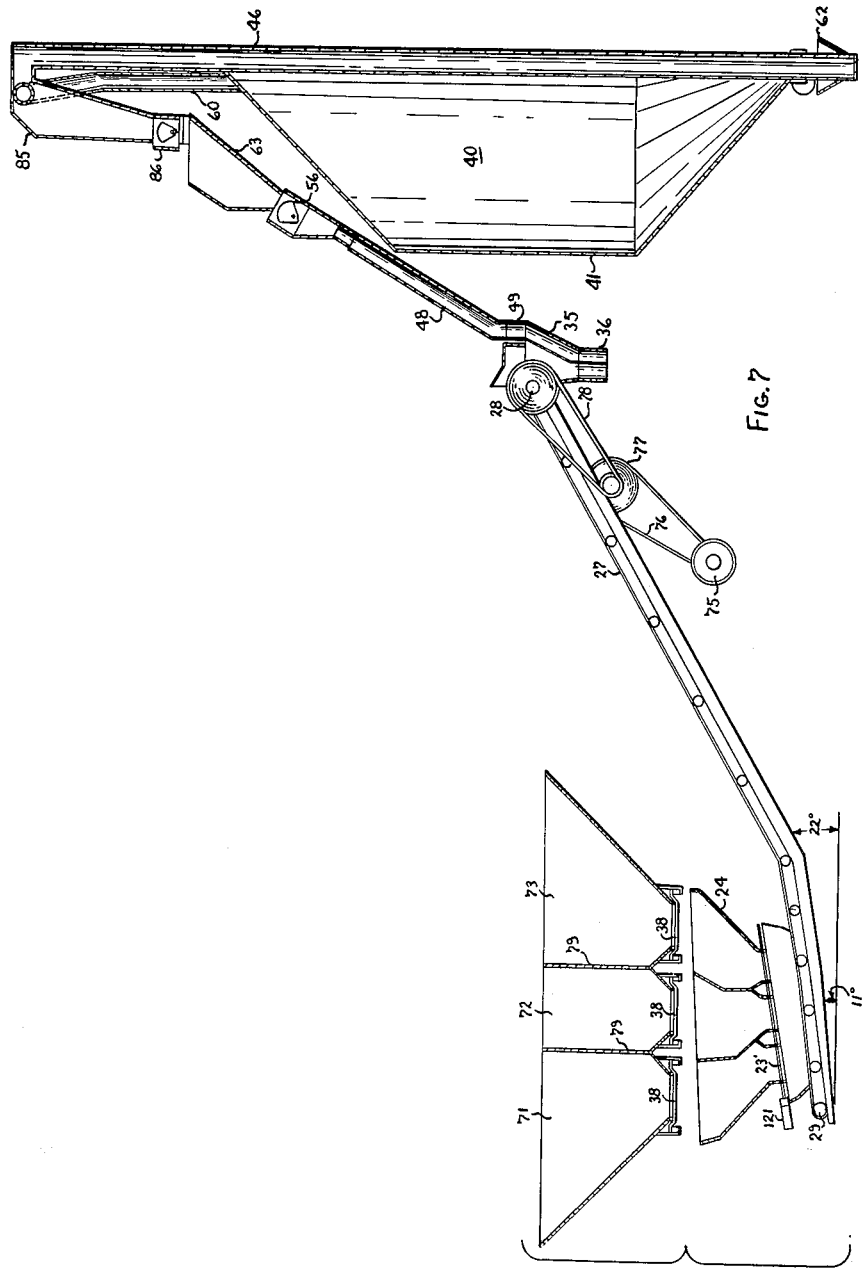

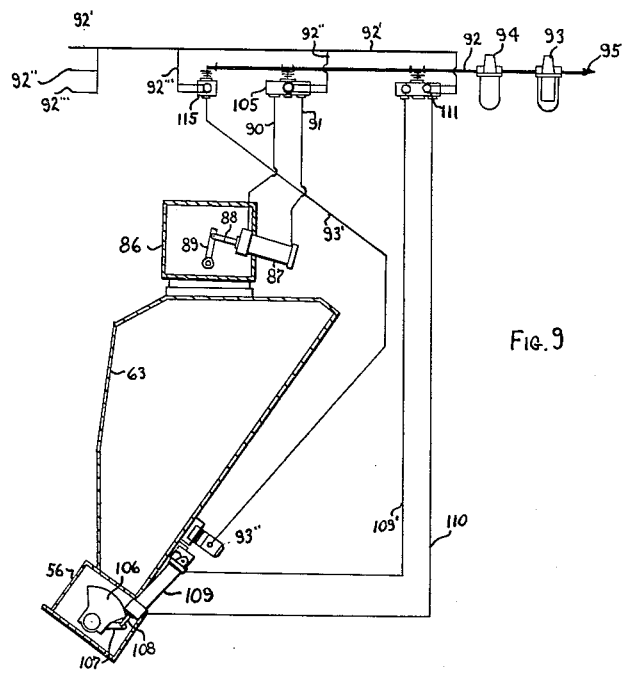
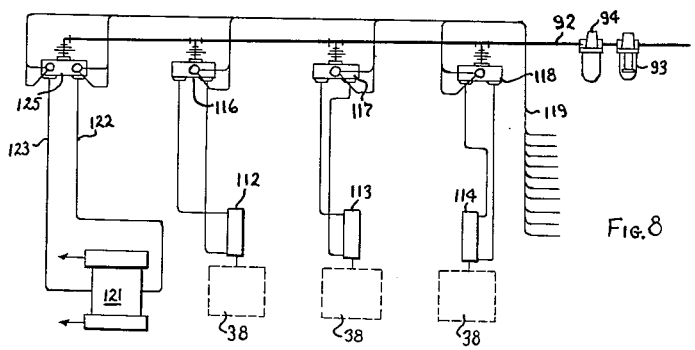

United States Patent Office 3,090,501
Patented May 21, 1963

3,090,501
CEMENT MIXING PLANT
John A. Auld, Erie, Pa., assignor to Erie Strayer Company, Erie, Pa., a corporation of Pennsylvania
Filed Mar. 23, 1959, Ser. No. 801,010
3 Claims. (Cl. 214—2)

This invention relates to concrete batching plants and, more particularly, to portable batching plants having a primary object of loading the proper amount of each type of aggregate and cement and other materials into a transit mixer truck or stationary mixer in a convenient and rapid manner.

Batching plants for use on construction and building projects frequently must be transported considerable distances and it is desirable that they be so constructed that they can be set up in a minimum of time with a minimum of effort and, also, can be transported along highways with maximum allowable height and width limitations which are controlled by local state laws. Batching plants made according to previous designs were frequently of such construction that it was necessary to completely dismantle them before they could be transported on highways having the usual height clearances, width, length, and weight limitations. Further, previous concrete batching machines with aggregate and cement storage bins had to be at least partially dismantled for transportation.

The combination aggregate and cement batching plant which makes up the machine according to the present invention is so designed that its maximum height when in a transporting position is less than the statutory height for bridges and other obstruction clearances, of lesser width than the legal width limitation, and of lesser length and weight. The present invention is capable of measuring and loading the proper amount of each type of aggregate and the proper amount of cement. Further, the cement hopper is filled by the same conveyor by which the cement batcher or weigh hopper is filled and, therefore, a reduction in cost of the equipment and weight thereof as well as a convenience is provided. The cement plant and aggregate plant can be used separate from each other if desired. The conveyor conveying cement from the cement haulage truck is driven by the same motor as the vertical screw conveyor, therefore economizing on the drive equipment. The aggregate bin has compartments which may contain stone, gravel, and sand, respectively. The aggregate conveyor is hinged adjacent its upper end so that the upper end can be slightly lowered for transportation. The machine is provided with hinged parking stands which can be readily pivoted and, therefore, the device can be parked and set up in a minimum amount of time.

The weigh hopper for weighing aggregate has a slope at the bottom which allows a conveyor disposed under the weigh hopper to slope upwardly and, therefore, minimize the length and vertical distance travelled by the main conveyor so that the overall height of the machine can be reduced to the statutory road clearance.

The cement storage bin has a configuration such that the operating parts of the cement batching equipment can be situated above, below, and around the storage bin itself. The cement chute for the cement batcher is swingably connected to the bin so that it folds up the prescribed height for transportation. The receiving hopper for receiving cement from a cement haulage truck, to be conveyed to the cement bin, is located at the corner of the frame adjacent the cylindrical storage bin, therefore minimizing the size of the machine. The cement batching plant is so constructed that it can be upended to the operating position and lowered to a horizontal position for travel without removing the road wheels therefrom, thereby minimizing the time and effort needed in setting up the machine.

More specifically, it is an object of this invention to overcome the disadvantages in prior machines and, more particularly, to provide a machine which is simple in construction, economical to manufacture, and simple and efficient in operation.

Another object of the invention is to provide an improved cement batching plant.

Still another object of the invention is to provide an aggregate batching plant having a three compartment aggregate bin with the bottom part of the bin disposed at an incline so that a belt can be supported and inclined upwardly thereunder.

Yet another object of the invention is to provide a three compartment aggregate batcher wherein all three compartments empty simultaneously on a belt, thereby providing a premixing action.

Yet still another object of the invention is to provide an improved cement batching plant and dispensing device in a cement batching plant wherein the weigh hopper is filled by the same conveyor with which the storage bin itself is filled.

A further object of this invention is to provide a cement conveyor means wherein a horizontal and a vertical conveyor is provided, one for delivering cement from a cement truck to the other, and both driven by the same motor or gasoline engine.

Yet a further object of the invention is to provide an improved conveyor in an aggregate batching plant, one end of the conveyor being adapted for lowering during transportation.

Still a further object of the invention is to provide an improved conveyor in combination with transporting wheels and hinged parking stands.

Yet still a further object of the invention is to provide an improved configuration of a cement storage bin in cement batching plant equipment.

It is a further object of the invention to provide an improved conveyor for the aggregate dispensing device of an aggregate batching plant wherein one part of the conveyor is inclined at approximately eleven degrees and a second part thereof is inclined at approximately twenty-two degrees.

It is yet a further object of this invention to provide a cement chute for a batcher which folds up to the prescribed height for transportation and which is moved downwardly to an operating position therefrom.

It is still a further object of the invention to provide an improved cement batching plant device having a cylindrical storage bin and a conveyor on one corner thereof.

It is still yet a further object of the invention to provide an improved cement batching plant having a weigh hopper with a sloping underside.

It is another object of this invention to provide an improved weighing device in combination with a cement batching plant.

It is still another object of the invention to provide a cement batching plant which is readily portable and which can be readily moved from place to place in a location where it is used.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is a side view of a cement and aggregate batching plant set up for operation showing the aggregate conveyor and hinged conveyor end swung downwardly in phantom lines;

FIG. 2 is a rear end view of the cement batching plant shown disposed in horizontal position for transportation;

FIG. 3 is an enlarged end view of part of the cement batching plant set up for operation;

FIG. 4 is an enlarged top view of the unloading conveyor of another embodiment of the invention;

FIG. 5 is an end view of part of the machine shown in FIG. 4;

FIG. 6 is an enlarged side view of the machine shown in FIGS. 4 and 5;

FIG. 7 is an enlarged partial cross sectional view of the aggregate and cement dispensing mechanism; and FIGS. 8 and 9 are wiring and piping diagrams of part of the control mechanism for the machine.

Now with more particular reference to the drawings, a combination aggregate and cement batching plant is shown with an aggregate batching plant 10 having a main frame 12 with a king pin 57' thereon for attaching it to a tractor of the type generally used for pulling trailers along a road for transportation. Wheels 14 support one end of the aggregate plant 10. The wheels 14 are attached by means of an axle to the main frame 12 which has the king pin 57' on the front end thereof and the wheels 14 are indicated as resting on a grade line 15 on the rear end thereof.

Vertical columns 16 are welded to the main frame 12 and extend upwardly therefrom. An upper frame 18 is welded to the column 16 at an intermediate part thereof. The aggregate bin shown has three compartments 71, 72, and 73 for containing large stones, small stones, and sand, respectively, and are welded to the tops of the vertical columns 16. A fifth wheel support 19 is attached to the front part of the frame 12 above the king pin 57' for supporting the front end of the batching plant 10 on a truck. A brace 20 is bolted or welded to the frame 12 at its lower forward end and to the column 16 at its upper rearward end to make the frame 12 rigid and to strengthen the front end thereof. Brace members 80 further stiffen the frame 12 and they are bolted or welded at their upper ends to a conveyor 27 and at the lower ends to the frame 12.

The compartments 71, 72, and 73 of the bin have partitions 79 therein for keeping the various sizes of aggregate separate from each other. The bottom of each of the compartments is closed by a sliding door 38. A water meter 23 is provided to meter the water put in each batch delivered into the truck by the conveyor 27. When the aggregate from the bin compartments 71, 72, and 73 is released through the doors 38, the aggregate falls into an aggregate weigh hopper 24 which is supported on a scale having beams in a beam box 25 for weighing the proper amount of aggregate. The weigh hopper discharge is controlled by a roller slide type gate 23' to open and closed position and it is operated by a cylinder 121 in an air circuit hereinafter to be described. The approach to the desired weights set on the scale beams is indicated on a dial 21. A control panel 26 has proper indicating devices thereon which indicate the weighing and discharge cycle of the aggregate.

The conveyor 27 is a wide belt made of rubber or other flexible material and the upper part of the conveyor 27 and the lower part of the conveyor flat sheet run over pulleys 28 and 29, respectively. The lower part of the conveyor 27 directly under the weigh hopper 24 is inclined up approximately eleven degrees. The upper part is inclined approximately twenty-two degrees. By having part of the rise of the conveyor 27 under the weigh hopper 24, the overall length of the conveyor 27 for a given rise can be reduced and kept within the legal limit of length when attached to a tractor for transportation.

In setting the aggregate batches up for operation, when the aggregate batching plant 10 is in operative position with the truck removed from under the fifth wheel support 19, a parking stand 30 will be swung to the position shown about its pivot point 31 and the uppermost end 33 of the conveyor 27 will be swung to operative position about its pivot 39 and locked thereto by means of a latch 82. When the device is in a transporting position, the upper end of the conveyor 27 along with a truck charging hopper 35 will be swung to a transporting position 34 as indicated in phantom lines. The truck charging hopper 35 has a flexible tube 36 on the lower end thereof for extending down into the truck mixer and forming a channel for the aggregate and cement to flow into the truck without undue dusting of the cement and, at the same time, the flexible tube 36 will allow the truck bed to move out from under the hopper without injury thereto.

The road height of the aggregate plant 10 is indicated by a line 37. The line 37 will normally be slightly less than twelve and one-half feet above the grade line 15 when the device is being transported. The width of the machine will normally be eight feet which is also within the legal width limits in all states in the United States. Therefore, a compact aggregate plant is provided which can be transported along the ordinary highway when moving from one job to another without the additional expense of transporting a machine which is larger than the legal allowable overall dimensions of both length and width and, also, height.

A cement plant 40 is shown having a cement bin or silo or repository 41 which is in the form of a cylinder tapered forwardly at the bottom and at the top to provide a space for the motor mechanism at the bottom and for the cement weighing apparatus indicated at the top and to bring the outlet from the silo 41 to the forwardmost position adjacent to the short inclined conveyor and vertical conveyor 46. The silo 41 is supported on columns 43 which are welded to the cement silo 41 at their upper ends and to a base 42 at their lower ends. The base 42, when in operative position, rests on the ground and may be levelled to suit the particular installation. Braces 44 and 68 further support the silo 41.

Upper braces 45 are welded to the cement silo 41 at their lower ends and extend upwardly to braces 47 which form a rigid structure at the top. The vertical conveyor 46 is in the form of a hollow tube and normally approximately nine inches in diameter. The conveyor 46 extends from the end thereof at a conveyor 84 to the top of the cement batching plant 40. A pivoted chute 48 is cylindrical in cross section and pivoted to the silo 41 at 53 by means of the ears shown. The chute 48 is pivoted to an arm 50 at 52 and the arm 50 is in turn pivoted to the ears attached to the slot at 51. A rubber tube 49 forms a continuation of the cylindrical chute 48 and extends downwardly into the hopper 35. A cement batcher 63 is supported on scales having levers 55 and the lower end thereof discharges through an air operated inlet valve 56 by means of a reducer connection 56' and a flexible connection 56" into the chute 48. The chute 48 is swingable about its pivot 53 to the stored position indicated at 54.

A king pin 57 is welded to a fifth wheel which is in turn attached to the cement batching plant 40 and road engaging wheels 58 are supported on an axle 69 which is in turn welded to the cement silo 41. A vent pipe 59 having a small pipe 59' with a hood over the top communicates with the inside of the silo 41 for carrying out dust and air from the silo 41. An overflow chute 60 is provided for the silo 41 with a surge hopper 85 connected thereto. The chute 60 conducts cement from the surge hopper 85 back to the silo 41 when the surge hopper 85 is filled. A pivoted parking stand 61 is swingably attached to the silo 41 and swingable outwardly to the position shown to hold the silo 41 temporarily in stored position when the truck is moved away from under the king pin 57. A crane is then connected to lifting lugs 74 to lift the silo 41 to the position shown for operation.

An air compressor 64 is supported on the base 42 for supplying air to the air operated valve 56. An electric motor 65 which could be of any other type drives the conveyor 46 and, also, the inclined screw conveyor 84 for conveying cement from a cement receiving hopper 62 to the vertical conveyor 46 and thence up to the surge hopper 85 having the general shape of an inverted cone or funnel. When the hopper 85 is full, the cement therefrom will return to the silo 41 through the return chute 60. The vertical conveyor 46 and the inclined conveyor 84 from the hopper 62 run constantly, carrying cement from the hopper 62 and from the silo 41 back into the surge hopper 85 and as the cement is used therefrom, it is discharged into the batcher 63 and from thence into the truck as shown.

The surge hopper 85 is of a size which will hold an amount almost equal to a batch. Therefore, the surge hopper 85, when dumped into the weigh batcher 63, will almost fill it and, therefore, only time to complete the truck batch need be supplied by the conveyor, thus saving time.

A pulley 66 driven by a belt 67 drives both the vertical and horizontal conveyors. The inclined conveyor 84 is driven by a shaft 70 connecting the two conveyors together for operation. A motor 75 is supported on the aggregate plant frame 12 and drives a pulley 77 through a belt 76 and a pulley 28 through a belt 78 to drive the conveyor 27. The brace members 80 support the conveyor 27 on the main frame 12 and when the upper end of the conveyor 27 is swung into position, it is locked in that position by a latch 82.

The cement batcher valve is shown in FIG. 9. FIG. 9 also shows the weigh batcher 63 having the lower cement valve 56 and an inlet cement valve 86. The inlet cement valve 86 is operated by a cylinder 87 having a piston rod 88 connected to a crank 89 which is in turn connected to the valve mechanism. The cylinder 87 is connected to air lines 90 and 91 for moving the double acting piston in the cylinder. A valve 105 connects the air lines 90 and 91 to an air supply 92 controlled through a regulator 93 and a filter 94 from a supply line 95.

A discharge cement valve 106 is connected to a lever 107 which is in turn connected to a piston rod 108 which in turn is disposed in a cylinder 109. The piston is a double acting piston and it is actuated from air lines 109' and 110 controlled by a valve 111 which connects air from the line 95 to the lines 109' and 110. The valves 115, 105, and 111 are opened and closed by electrical current supplied from suitable switches from lines 92', 92'', and 92'''.

The aggregate doors 38 closing the aggregate bin compartments 71, 72, and 73 are controlled by double acting cylinders 112, 113, and 114, respectively. The cylinders 112, 113, and 114 are controlled by air from the air lines connected thereto which are selectively connected to the supply 92 by valves 116, 117, and 118. Electrical current from a suitable switching arrangement controlled by the weighing mechanism is provided to open and close the valves 116, 117, and 118 through wires indicated at 119.

The double acting air cylinder 121 controls a gate 23'. The cylinder 121 is actuated by air from lines 122 and 123 controlled by a valve 125 controlled by the wires 119. The valve 115 is actuated by the electrical line 92''' to conduct air from the air supply 92 to a line 93' to actuate a cylinder 93''.

In the embodiment of the invention shown in FIGS. 4, 5, and 6, an alternate conveyor system is shown wherein hoppers 297 and 298 are disposed from below a grade line 215 so that a truck may drive over the hoppers 297 and 298. A conveyor 299 has a spiral screw therein and carries cement from the hoppers 297 and 298 to a discharge 200 and from thence, the cement flows into an inlined pipe 284. The conveyor 299 is driven by a shaft 201 and is controlled with a clutch 207. A shaft 202 drives the conveyor or pipe 284 and a belt 203 drives the shafts 201 and 202 from a motor 265.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A cement dispensing device comprising a vertically extending silo, frame means supporting said silo in a vertical position, the lower end of said silo tapering to an opening at one side thereof and the upper end being inclined at an angle of approximately forty-five degrees toward one side, a cement batcher and a generally inverted, conical shaped surge hopper having walls independent of the walls of said silo supported on said silo above said inclined end, a vertical conveyor, hopper means at the lower end communicating with said conveyor, said conveyor conveying material from said hopper means to said hopper at the top thereof, weighing means for weighing predetermined amounts of said material in said cement batcher, said hopper having an overflow opening therein, and means connecting with said opening the inside of said silo for returning an excess of material therefrom to said silo, the material from said silo returning to said hopper through said opening at the bottom thereof.

2. The device recited in claim 1 wherein a truck charging cement hopper with a cement valve is provided and said weighing means is connected thereto and discharges said material into said truck charging hopper.

3. The device recited in claim 2 wherein road engaging wheels are attached to said silo at a point intermediate the height thereof, and a fifth wheel and a king pin are attached to the upper end thereof for being received in a tractor when said silo is disposed in a horizontal position for transportation.

References Cited in the file of this patent

UNITED STATES PATENTS

| | | |
|---|---|---|
| 1,782,734 | MacDougald | Nov. 25, 1930 |
| 2,048,877 | McCrery | July 28, 1936 |
| 2,310,592 | Noble | Feb. 9, 1943 |
| 2,347,437 | Saxe | Apr. 25, 1944 |
| 2,533,852 | Tietig | Dec. 12, 1950 |
| 2,679,322 | Martinson | May 25, 1954 |
| 2,873,036 | Noble | Feb. 10, 1959 |
| 2,880,890 | Stuller | Apr. 7, 1959 |
| 2,886,189 | Funderburk | May 12, 1959 |
| 2,896,771 | Mecham | July 28, 1959 |
| 3,024,930 | Sims | Mar. 13, 1962 |